United States Patent [19]

Nowack

[11] 3,970,812
[45] July 20, 1976

[54] PLURAL, STACKED SIDE BY SIDE SWITCH HOUSING ARRAY HAVING DISCRETE HOUSING COUPLING ELEMENTS

[75] Inventor: Klaus Nowack, Baden, Switzerland
[73] Assignee: Contraves AG, Zurich, Switzerland
[22] Filed: Nov. 11, 1974
[21] Appl. No.: 522,746

[30] Foreign Application Priority Data
June 21, 1974 Switzerland.................... 8505/74

[52] U.S. Cl............................... 200/307; 46/26
[51] Int. Cl.² ................ H01H 9/02; H01H 13/02; A63H 33/10
[58] Field of Search ................ 200/293–307, 200/5 R, 5 A, 159 R, 159 B, 159 A; 46/25, 26; 197/98

[56] References Cited
UNITED STATES PATENTS

| | | | |
|---|---|---|---|
| 2,132,647 | 10/1938 | Robins | 46/26 |
| 3,085,963 | 4/1963 | Martin | 46/26 X |
| 3,093,568 | 6/1963 | Cox | 46/26 X |
| 3,286,070 | 11/1966 | Volker | 200/303 |
| 3,663,780 | 6/1970 | Golbeck | 200/294 |
| 3,900,712 | 8/1975 | Fukao | 200/295 X |

Primary Examiner—James R. Scott
Attorney, Agent, or Firm—Werner W. Kleeman

[57] ABSTRACT

A mosaic arrangement of switch elements, especially electrical push-button switches with quadratic or square switch bodies, arranged at the front surface or side of electrical switch panels and the like, wherein the switch bodies possess at their edge corners extending perpendicular to the front surface of the switch panel recesses which at least over a portion of the length of the corners are constructed as guide grooves, and wherein at least partially at the crossover locations or intersection of the mosaic arrangement of the switch elements, there are provided coupling elements having four corner noses each of which engages in the guide groove of a respective switch body for insertion in the neighboring recesses of the switch bodies bounding at such crossover or intersection locations.

6 Claims, 12 Drawing Figures

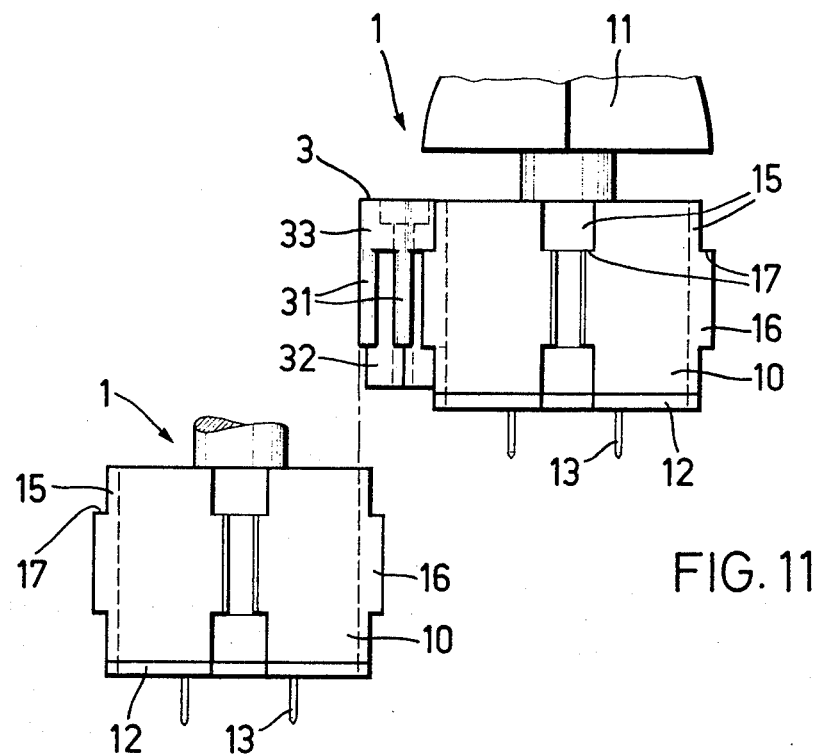
FIG. 11
FIG. 12
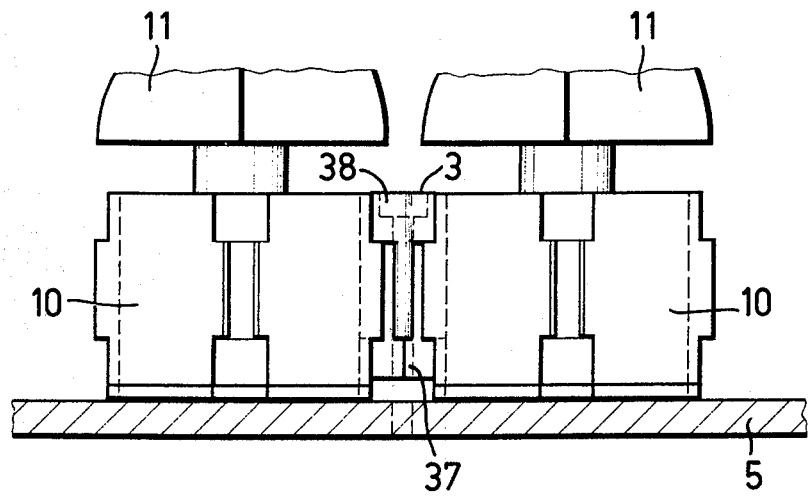

PLURAL, STACKED SIDE BY SIDE SWITCH HOUSING ARRAY HAVING DISCRETE HOUSING COUPLING ELEMENTS

BACKGROUND OF THE INVENTION

The present invention relates to a new and improved construction of mosaic arrangement of switch elements or components, especially electrical push-button switches.

Prior art arrangements of switch components or elements, especially electrical push-button switches with square or quadratic switch bodies arranged at the front side or surface of electrical switch panels and the like, employ a cross-rail grid arrangement for receiving the switch components and which consists of a number of grid rails located transversely with respect to one another and equipped with slots for assembly purposes. What is especially disadvantageous with this construction is the great logistical expenditure when using such grids for random grid structures.

SUMMARY OF THE INVENTION

It is a primary object of the present invention to provide a new and improved mosaic arrangement of switch elements, especially electrical push-button switches, which is extremely simple and reliable in construction, economical to manufacture and easy to assemble.

Another object of the present invention resides in arranging next to one another in rows switch elements into a random mosaic-shaped preferably grid-shaped structure with the aid of simple and as identical as possible components.

Now in order to implement these and still further objects of the invention, which will become more readily apparent as the description proceeds, the invention contemplates that the switch bodies of the switch elements are provided at their edge corners extending at right angles or perpendicular to the front surface of the switch panel with recesses which at least over a part of the length of the corners are constructed as guide grooves, and that at least partially at the crossover or intersection locations of the switch elements there are provided coupling elements having four corner noses each engaging in the guide groove of a respective switch body for insertion at the neighboring recesses of the switch bodies which neighbor one another at the intersection locations. Preferably the guide grooves in the recesses of the switch body are constructed only partially thereat, however centrally over the length of the corners for forming projections and the coupling elements in turn possess at one side of the projections of the recesses shoulders which fit the switch body. Advantageously the coupling elements are each provided with an axial throughpassage bore for receiving a respective attachment screw and the guide grooves in the switch body and the corner noses engaging therein of the coupling elements possess a circular sector-shaped cross-section.

BRIEF DESCRIPTION OF THE DRAWING

The invention will be better understood and objects other than those set forth above, will become apparent when consideration is given to the following detailed description thereof. Such description makes reference to the annexed drawings wherein:

FIG. 11 illustrates in exploded view two push-button switches and a coupling element in a position for assembly; and FIG. 12 illustrates the arrangement of FIG. 11 with the two push-buttons interlocked by the coupling element and secured to a switch panel or circuit board.

DETAILED DESCRIPTION OF THE PREFERRED EMBODIMENTS

Figure 1:
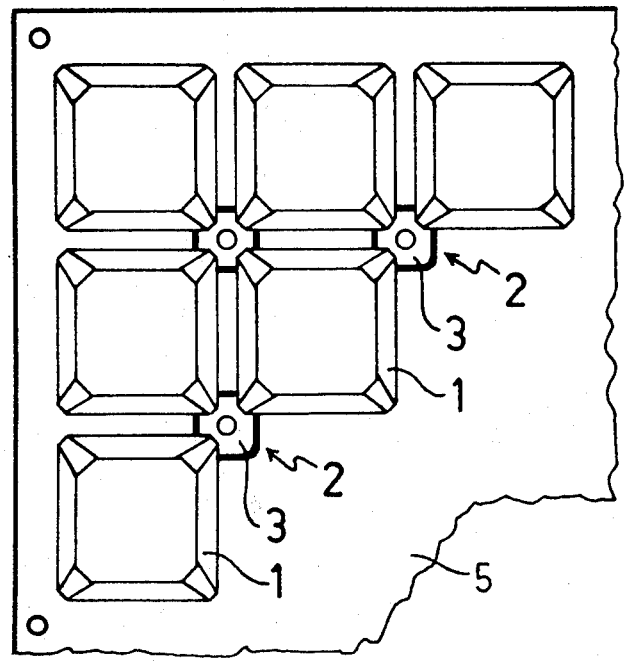
FIG. 1 is a section of a grid-shaped arrangement of switch elements in plan view.
Figure 3:
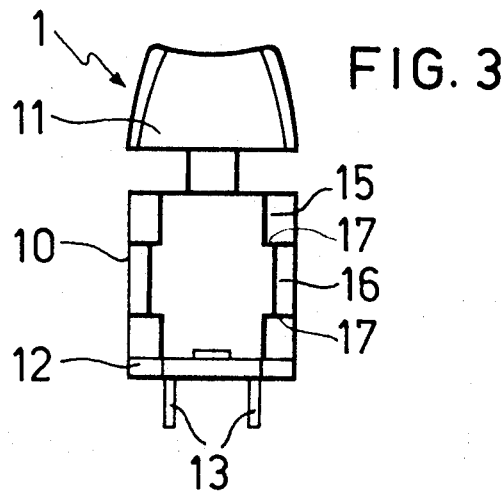
FIG. 3 illustrates a push-button switch in front view.

Describing now the drawings, in FIG. 1 there is shown in plan view a sectional detail of switch components or elements, for instance push-button switches 1, according to the showing of FIG. 3, which are arranged in a grid-like configuration at the front surface or face of a switch panel or board 5. At a number of the grid crossover or intersection locations 2 there are mounted coupling elements 3 for spacing, holding together and the attachment of the push-button switches 1 which neighbor one another at such crossover or intersection locations. Basically it would be possible to provide at each corner of a push-button switch 1 i.e. at each grid crossover or intersection location 2 one such coupling element 3.

Figure 4:
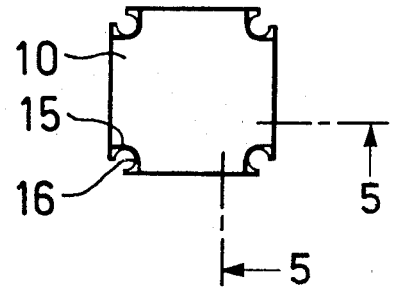
FIG. 4 illlustrates the outline in plan view of a switch body.
Figure 5:
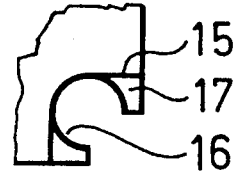
FIG. 5 is a section of a corner of a switch body in plan view taken along the line 5—5 of FIG. 4.
Figure 8:
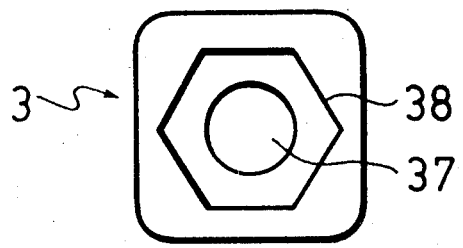
FIG. 8 illustrates the arrangement of FIG. 7 in top view.
Figure 6:
FIG. 6 illustrates a front view of a coupling element.
Figure 7:
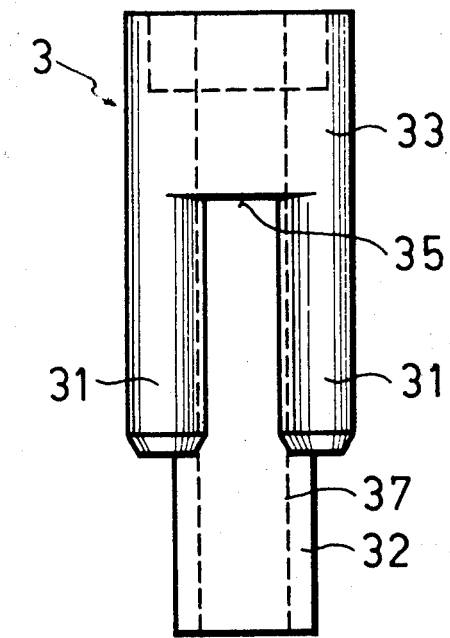
FIG. 7 is an enlarged view of the arrangement of FIG. 6.

According to the showing of FIG. 3 a push-button switch 1 essentially encompasses the push-button 11, the switch body 10 as well as, in this example, the base plate 12 with the connection pins 13. The outline of the switch body or housing 10 has been shown in FIG. 4 and a section of a corner thereof in enlarged view, according to the section line 5—5, in FIG. 5 in plan view. Each switch body 10 possesses at the four edge corners which extend perpendicular to the front surface of the switch panel 5 recesses 15 which are constructed at least over a part of the edge corner length also as guide grooves 16, as best recognized by referring to FIGS. 5, 11 and 12. The guide grooves 16 in the exemplary embodiment under discussion possess a circular sector-shaped cross-section, which can be best recognized by referring to FIG. 5, but it should be appreciated that also other cross-sectional shapes are conceivable, for instance dovetail and the like. Owing to the only partially provided guide grooves 16 which however are located centrally over the edge corner length, there are formed at the recesses 15 and at the two end faces of the guide grooves the projections 17 as such has been clearly illustrated in FIG. 3 and also in FIGS. 5, 11 and 12. A coupling element 3, of the type according to the showing of FIG. 6, has been shown in front view in the enlarged illustration of FIG. 7, in plan view in FIG. 8 from the bottom in FIG. 9, and in the push-button switch interlocking position in FIG. 12, and consists of four corner noses or projections 31 which in cross-section are of circular sector-like configuration and extend over the central portion of four edge corners, a square lower part 32 and a likewise square upper part 33 which, however, is rounded at its corners with the radius of the corner noses 31.

At the transition of both parts or components 32 and 33, that is, at the shoulders of the corner noses 31 at the part 33 there are formed four shoulders 35. The switch body 10 and coupling element 3 are constructed such that a respective corner of the latter can be inserted in a respective recess 15 of the switch body, that is, a respective corner nose 31 bears in a respective guide groove 16 and selectively from both sides until in each instance the shoulder 35 bears at the shoulder or projection 17. The coupling element 3 can be provided with an axial bore 37 for receiving an attachment of fasten ing screw and, for instance, at its upper end with a hexagonal-shaped recess 38 for taking up a nut member or the like. By appropriately dimensioning the corner noses 31 and the guide grooves 16 the press or snug fit can be varied and by virtue of the selection of the width of the square-shaped part 33 the grid spacing can be influenced. With the aid of such coupling elements 3 it is possible to directly secure both individual ones as well as switching elements which are randomly arranged in a row, for instance at a printed circuit board, such as the board on panel 5. A push-button switch can be constructed such that the base plate 12 with the connection pins 13 can be dispensed with in that the switch contacts act directly at corresponding contact locations at the printed circuit board.

Figure 2:
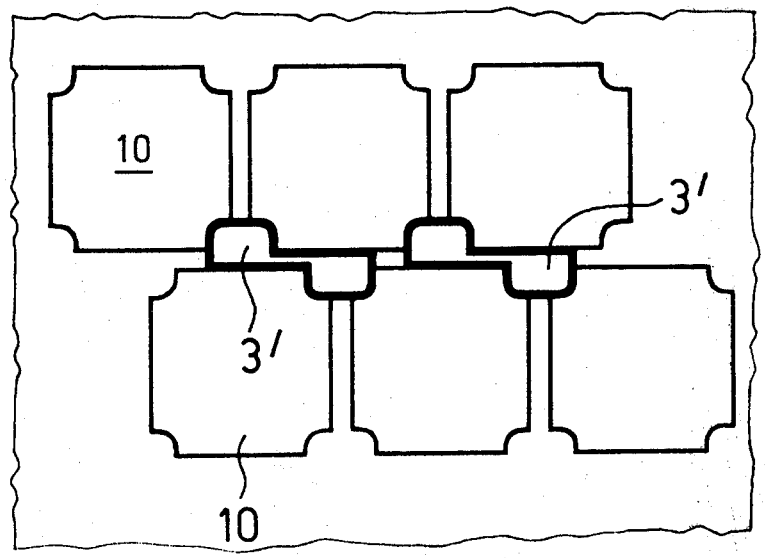
FIG. 2 is a further section of an offset grid arrangement.
Figure 10:
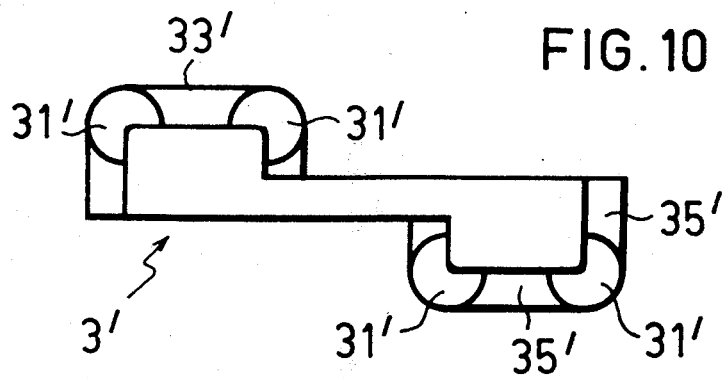
FIG. 10 illustrates a coupling element of FIG. 2 as viewed from below analogous to the showing of FIG. 9.
Figure 9:
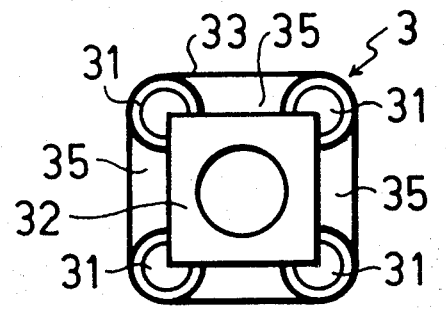
FIG. 9 illustrates the arrangement of FIG. 7 as viewed from below.

It is within the contemplation of the invention, however, not only to include precise grid arrangements but rather also other mosaic arrangements of switch elements. For instance, FIG. 2 shows an example of two rows of switch housings or bodies 10 which are arranged offset through one-half of a switch division or spacing. An appropriately required coupling element 3' is illustrated, as viewed from below, in FIG. 10. The individual components or parts thereof analogous to FIG. 9, are designated in this instance with the same reference character but further including a prime marking.

The inventive solution allows for the spacing, holding together and attachment of switch element structures in a simple and inexpensive manner and additionally the mountable and demountable coupling elements can be used as often as desired.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A mosaic arrangement of switch elements, especially electrical push-button switches with substantially quadratic switch bodies arranged at intersection locations at the front surface of an electrical switch panel and the like, the improvement wherein each of the switch bodies are provided with recesses at their edge corners extending substantially perpendicular to the front surface of the switch panel, each of said recesses being constructed over a portion of the edge corner length as guide grooves, and at least partially at the intersection locations there are provided coupling elements, each coupling element having four corner noses, said four corner noses extending into respective recesses of switch bodies neighboring one another at an intersection location and engaging with respective guide grooves of said neighboring switch bodies for interlocking to one another said neighboring switch bodies, each coupling element being provided with an axial throughpassage bore for receiving an associated attachment means for securing the switch bodies which are interlocked by such coupling element to the electrical switch panel.

2. The arrangement as defined in claim 1, wherein the guide grooves in the recesses of the switch body are only partially provided thereat but centrally of the associated edge corner length for forming projections, and wherein the coupling elements possess at one side of the projections of the recesses of the switch bodies shoulders cooperating with said projections.

3. The arrangement as defined in claim 2, wherein the guide grooves in the switch bodies and the corner noses engaging therein of the coupling elements possess a substantially circular sector-shaped cross-section.

4. The combination of at least two switch elements and a coupling element for releasably interlocking said two switch elements with one another, each switch element comprising a switch body having an edge region, said edge regions of said two switch bodies being located adjacent one another, each of said edge regions being provided with recess means extending in the lengthwise direction of its switch body, each of said recess means having guide groove means, each coupling element having at least two corner noses, said coupling element, when interlocking said two switch elements with one another, having a respective nose seated in a respective recess means of a switch body and extending into the groove means thereof for releasably interlocking said two switch bodies to one another.

5. The combination as defined in claim 4, wherein each said recess means extends substantially over the entire length of the edge region of its switch body.

6. The combination as defined in claim 4, wherein each guide groove means has a projection means at an upper end thereof, said coupling element being provided with shoulder means bearing against said projection means when said coupling element interlocks said two switch bodies in order to limit the extent of insertion of the noses of the coupling element into said recess means.

* * * * *